US006299969B1

(12) United States Patent
Altieri et al.

(10) Patent No.: US 6,299,969 B1
(45) Date of Patent: Oct. 9, 2001

(54) EXPANDED STARCH-BASED SHAPED PRODUCTS AND THE METHOD OF PREPARATION THEREOF

(75) Inventors: Paul A. Altieri, Belle Mead; Beth C. Tormey, Frenchtown, both of NJ (US)

(73) Assignee: National Starch & Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/221,075

(22) Filed: Dec. 28, 1998

Related U.S. Application Data

(63) Continuation of application No. 08/795,535, filed on Feb. 5, 1997, now abandoned, which is a continuation-in-part of application No. 08/338,059, filed on Nov. 10, 1994, now abandoned, which is a continuation-in-part of application No. 08/440,165, filed on May 12, 1995, now Pat. No. 5,849,233, which is a continuation of application No. 08/069,632, filed on Jun. 1, 1993, now abandoned, which is a continuation of application No. 07/796,739, filed on Nov. 25, 1991, now abandoned.

(51) Int. Cl.[7] .............................. B32B 5/16; B29C 47/00
(52) U.S. Cl. ............................. 428/219; 127/32; 127/33; 264/211; 264/211.11; 428/327; 428/340
(58) Field of Search ..................................... 428/402, 219, 428/327, 340; 521/81, 84.1; 264/211, 211.1; 127/32, 33

(56) References Cited

U.S. PATENT DOCUMENTS

| 3,753,729 | | 8/1973 | Harms et al. ............................ 99/82 |
| 4,863,655 | * | 9/1989 | Lacourse et al. ...................... 264/53 |
| 5,035,930 | | 7/1990 | Lacourse et al. ................... 428/35.6 |
| 5,043,196 | | 8/1991 | Lacourse et al. ................... 428/35.6 |
| 5,153,037 | | 10/1992 | Altieri ................................ 428/35.6 |
| 5,185,382 | * | 2/1993 | Neumann et al. .................. 521/84.1 |
| 5,208,267 | | 5/1993 | Neuman et al. ....................... 521/79 |
| 5,248,702 | | 9/1993 | Neuman et al. .................... 521/84.1 |
| 5,252,271 | * | 10/1993 | Jeffs ....................................... 264/54 |
| 5,272,181 | | 12/1993 | Boehmer et al. .................. 521/84.1 |
| 5,279,658 | | 1/1994 | Aung ................................. 106/154.1 |
| 5,314,754 | | 5/1994 | Knight ................................. 428/532 |
| 5,354,621 | | 10/1994 | Liebermann ....................... 428/532 |
| 5,554,660 | * | 9/1996 | Altieri et al. .......................... 521/81 |
| 5,665,786 | * | 9/1997 | Xu et al. ............................. 521/84.1 |
| 5,756,556 | * | 5/1998 | Tsai et al. ........................... 521/84.1 |
| 5,766,529 | * | 6/1998 | Franke et al. ........................ 264/143 |
| 5,797,984 | * | 8/1998 | Billmers et al. ...................... 127/33 |
| 5,863,342 | * | 1/1999 | Tsai et al. .............................. 127/38 |
| 6,027,417 | * | 2/2000 | Willett et al. .......................... 524/17 |

* cited by examiner

Primary Examiner—Hoa T. Le
(74) Attorney, Agent, or Firm—Lourcke A. Duncan, Esq.; Eugene Zagarella, Esq.

(57) ABSTRACT

A biodegradable, structured shaped product having good flexibility or rigidity properties is provided by extruding starch having a relatively large defined particle size and preferably containing a nucleating agent.

29 Claims, No Drawings

# EXPANDED STARCH-BASED SHAPED PRODUCTS AND THE METHOD OF PREPARATION THEREOF This is a continuation of application Ser. No. 08/795,535 filed Feb. 5, 1997 and which application is a continuation-in-part of application Ser. No. 08/338,059 filed Nov. 10, 1994 now abandoned, and continuation-in-part of application Ser. No. 08/440,165 filed May 12, 1995 now U.S. Pat. No. 9,849,253, which in turn is a continuation of application Ser. No. 08/069,632 filed Jun. 1, 1993 and now abandoned, which in turn is a continuation of application Ser. No. 07/796,739 filed Nov. 25. 1991 and now abandoned.

BACKGROUND OF THE INVENTION

This invention relates to expanded or foamed shaped starch products which are made by extrusion under select conditions using starch feed materials having a defined particle size.

Starch, a readily available known biodegradable material, has been used to prepare foamed; film and other shaped products for different purposes including selected packaging applications. Some of these starch products and their uses are described in U.S. Pat. Nos. 5,035,930 and 5,043,196.

Extrusion is a well known technique, widely used in forming plastic materials into various foamed and expanded products. More recently, the extrusion of starch into expanded articles has shown increased interest as noted in the aforementioned '930 and '196 U.S. patents which disclose the extrusion of low density, high amylose starch into packaging materials. Other disclosures of forming starch products by extrusion can be found in U.S. Pat. No. 5,248,702 directed to packaging fillers and in U.S. Pat. No. 5,314,754 involved with the formation of shaped products such as films, rods and sheets. Another disclosure, EP 0 544 234 shows the general process of starch extrusion. However, despite this background of extrusion as well as the known capability of using starch in forming expanded products, the ability to produce different large shaped or structured starch products such as flexible sheets and rigid boards or planks, has not been easily attained.

While much attention has been directed to finding different starch compositions including combinations with various synthetic polymers and additives such as plasticizers, only limited consideration has been given to the nature of the extrusion process itself. Extrusion and expansion of starch not only is different from plastics, but even varies in many respects when large structured products are formed as compared to the formation of smaller products such as cylinders, tubes, rope like products and narrow sheets. In order to produce large shaped products, the need to utilize extruder dies of different shapes and configurations is apparent. However, the ability to make large expanded starch products is complicated by the fact that most of the properties in the smaller formed products have to be maintained or improved while several other properties such as flexibility or rigidity have to be satisfied. The process of forming large structured foam products not only involves a change in the die configuration and size but has to overcome problems or variations caused by increased threshold throughput or feed rates and changes in processing pressure and product cell structure.

Accordingly, there is a need to define a method for producing structured shaped starch products, having the necessary properties such as flexibility or rigidity, and the products produced by this method.

SUMMARY OF THE INVENTION

The present invention provides a biodegradable, structured, shaped product having good flexibility or rigidity properties as well as compressibility and resilience comprising an expanded, closed cell starch product wherein the product is formed by extruding starch which has a selected particle size. More particularly, the expanded starch product of this invention is a structured, shaped product made by extruding starch having a particle size of from 400 to 1500 microns.

DETAILED DESCRIPTION OF THE INVENTION

The ability to provide large shaped or structured starch products for use in packaging or other applications is the main objective of this invention. The term "structured" product as used herein refers to products having relatively large configurations or shapes such as wide and/or thick sheets and planks. Typically this would include sheets, planks or board having thicknesses of several inches or more and more particularly up to 4" and varying widths of 24" to 48" or more. Sheets which are usually flexible, typically have thicknesses of up to ¼" while planks or boards, which are usually rigid or semi-rigid typically have thicknesses of ¼" to 1".

The formation of shaped starch products by extrusion is becoming of more interest and has been described many times in the recent literature as noted previously. Most of the disclosures have been involved with providing shaped fillers and random or smaller packaging materials such as discrete loosefill products, sometimes called peanuts, or very small sheets. The ability to extend this processing concept to the formation of bigger or larger starch shaped products has not been a simple or direct extension of the known technology. This is because the chemical nature of starch is quite different from the various plastic and synthetic materials, such as styrene and polyethylene, that have been extruded into shaped products for many years. Additionally, while the rheology of starch extrusion to form smaller loosefill type products is similar in some respects to the extrusion of larger structured products, it is also different or lacking in other properties or aspects. Along these lines it is noted that the extrusion of starch to produce the structured foamed products generally requires dies with large openings or increased cross sectional areas. This means higher throughput or feed rates to satisfy pressure, fill rates and other rheological properties needed to produce products with suitable properties. One significant variation is that of cell structure in the resulting product.

In order to provide suitable extrusion properties and particularly the needed high feed rates and threshold throughput in forming desired structured starch products it has been found that the feed starch particle size is an important factor. A significantly large and defined particle size has been found especially advantageous in providing desirable extrusion processing conditions and resulting product properties. The useful particle size is large and in a defined range of from about 400 to 1500 microns and more particularly from about 800 to 1200 microns. When using starch feed material with this defined particle size, the extrusion processing conditions including feed rate and pressure, plus needed cell structure in the formed product were more readily attainable to provide the structured product of suitable characteristics. Generally, essentially all of the starch feed will have the noted particle size, however, amounts of up to about 10 to 20% of the starch feed may have particle size outside the specified range without substantially affecting the process condition and/or product properties.

In order to obtain the starch feed material having the necessary particle size in accordance with this invention, a method known as compact granulating, commonly referred to as chilsonating, may be used. Other methods to attain desired starch particle size may also be used provided substantially all of the starch feed material is within the prescribed size range.

Another feature which improves processing and the properties of the resulting structures starch products is the addition of a nucleating agent or salt to the starting starch feed material. This is especially helpful when dies of increased and large open areas or cross section are used and particularly improves the cell structures of the expanded product. Various nucleating agents or salts may be used in this capacity including any inorganic, water soluble salt or mixtures thereof and especially an alkali metal or alkaline earth metal salt such as sodium sulfate and sodium chloride. Other nucleating agents such as microtalc can be used but the alkali metal or alkaline earth metal salts are preferred. The amount of nucleating agent used will depend on particular processing conditions and desired extruded product dimensions with at least 1%, more particularly at least 2% and preferably from 4% to 8% by weight of nucleating agent, based on the weight of starch in the feed composition, being used. When making flexible sheets it has been found desirable to use 2 to 5% by weight of nucleating agent and with rigid or semi-rigid planks it has been found desirable to use from 1 to 3% by weight of nucleating agent. In general, the higher amounts of nucleating agent have been found very beneficial when using large die openings needed to produce the structured starch products. It is further noted that the nucleating agent or salt can be added to the feed starch or in certain circumstances may be present as residual salt or ash content in the already prepared starch. The combination of defined starch particle size and the addition of nucleating agent, as defined herein, has been found to be especially advantageous in producing the structured foam starch products in accordance with this invention.

The starting starch material useful in this invention may be any of several starches, native or converted. Such starches include those derived from any plant source including corn, potato, wheat, sago, tapioca, waxy maize, sorghum and high amylose starch such as high amylose corn, i.e., starch having at least 40% by weight of amylose content, etc. Starch flours may also be used as a starch source. Also included are the conversion products derived from any of the former bases including, for example, dextrin prepared by hydrolytic actions of acid and/or heat; oxidized starches prepared by treatment with oxidants such as sodium hypochlorite; fluidity or thin boiling starches prepared by enzyme conversion or mild acid hydrolysis; and derivatized and crosslinked starches.

Modified starches are particularly useful in this invention. By modified it is meant that the starch can be derivatized or modified by typical processes known in the art, e.g., esterification, etherification, oxidation, acid hydrolysis, crosslinking and enzyme conversion. Typically, modified starches include esters, such as the acetate and half-esters of dicarboxylic acids, particularly the alkenylsuccinic acids; ethers, such as the hydroxyethyl and hydroxypropyl starches and starches reacted with hydrophobic cationic epoxides; starches oxidized with hypochlorite; starches reacted with crosslinking agents such as phosphorus oxychloride, epichlorohydrin, and phosphate derivatives prepared by reaction with sodium or potassium orthophosphate or tripolyphosphate and combinations thereof. These and other conventional modifications of starch are described in publications such as "Starch: Chemistry and Technology", Second Edition, edited by Rov L. Whistler et al. Chapter X; Starch Derivations: Production and Uses by M. W. Rutenberg et al. Academic Press, Inc. 1984.

One modification of the starches used in this invention that is especially useful is the etherification with alkylene oxides, particularly those containing 2 to 6, preferably 2 to 4 carbon atoms. Ethylene oxide, propylene oxide and butylene oxide are exemplary compounds that are useful in etherifying the starting starch materials, with propylene oxide being especially preferred. Varying amounts of such compounds may be used depending on the desired properties and economics. Generally, up to 15% or more and preferably, up to about 10%, by weight, based on the weight of starch will be used.

In a preferred embodiment, the starch material is a high amylose starch, i.e., one containing at least 40%, by weight, and more preferably at least 65%, by weight, of amylose. Further preferred are the high amylose starches modified by etherification with alkylene oxides, as described above.

Blends of two or more of the starch starting materials may be used as well as additive or synthetic compounds to improve properties such as water resistance, strength, flexibility, color, etc. Compounds such as polyvinyl alcohol, ethylene vinyl alcohol, polyvinyl acetate, poly (ethylene vinyl acetate), monoglycerides, styrene acrylate resins are typical additives which may be used. These additives may be used in any amount that will effectively satisfy the desired property, provided the extrusion of the starch and the overall properties of the expanded product are suitable. Generally, up to about 50% by weight of such additives, and preferably up to about 10% by weight, may be used.

The expanded shaped products of this invention are prepared using an extrusion process. The apparatus used in carrying out the extrusion process may be any screw type extruder. While the use of a single or twin screw extruder may be used, it is preferred to use a twin-screw extruder. Such extruders will typically have rotating screws in a horizontal cylindrical barrel with an entry port mounted over one end and a shaping die mounted at the discharge end. When twin screws are used, they may be co-rotating and intermeshing or non-intermeshing. Each screw will comprise a helical flight or threaded sections and typically will have a relatively deep feed section followed by a tapered transition section and a comparatively shallow constant-depth meter section. The motor driven screws, generally fit snugly into the cylinder or barrel to allow mixing, heating and shearing of the material as it passes through the extruder.

Control of the temperature along the length of the extruder barrel is important and is accomplished in zones along the length of the screw. Heat exchange means, typically a passage such as a channel, chamber or bore located in the barrel wall, for circulating a heated media such as oil, or an electrical heater such as calrod or coil type heaters, are often used. Additionally, heat exchange means may also be placed in or along the shaft of the screw device.

Variations in any of the elements used in the extruder may be made as desired in accordance with conventional design practices. A further description of extrusion and typical design variations can be found in "Encyclopedia of Polymer Science and Engineering", Vol. 6, 1986, pp. 571 to 631.

In carrying out the extrusion process, temperatures in the extruder will vary depending on the particular material, desired properties and application. They can generally range from about 100 to 250° C. and preferably when extruding high amylose starch will range from about 150 to 210° C. The total moisture content of the starch in the extruder, i.e., moisture present in the inlet fed starch plus water added during processing, will be about 25% or less by weight, based on the weight of starch. More particularly, the total moisture content of the starch will range from about 10 to 25% and preferably from about 15 to 21%.

Various dies and die configurations may be used in the extruder and extrusion process with an annular or tubular die being one suitable type. Upon exiting the extruder, the expanded starch product is slit or cut using a knife or other cutting means and spread or passed over a mandrel and then further conveyed through rollers or calendering rolls. In the case of sheets they may be compressed to a degree as they pass through the rollers to help provide the flexibility and softness desired.

The product emerging from the extruder and processing operations is an expanded closed cell material of relatively low density with good flexibility or rigidity as well as resilience and compressibility. The product will be biodegradable or substantially biodegradable depending on whether it comprises all starch or if it includes other components, the nature of such components. Biodegradability has become a desired feature of many products because of the environmental problems associated with waste disposal. The term "biodegradable" as used herein refers to the susceptibility of a substance to decomposition by living things (organisms/microorganisms) and/or natural environmental factors, e.g., the ability of compounds to be chemically broken down by bacteria, fungi, molds and yeast.

The uniform, closed cell structure of the expanded product helps to give it desired properties such as flexibility or rigidity as well as resilience and compressibility. A close cell structure is defined as one having largely nonconnecting cells, as opposed to open cells which are largely interconnecting or defined as two or more cells interconnected by broken, punctured or missing cell walls.

The bulk density of the product will be from about 2 to 16 lb/ft$^3$ and preferably from about 5.5 to 10 lb/ft$^3$; the resiliency will be at least about 20%, preferably at least about 50% and the compressibility will range from about 100 to 800 and preferably from about 200 to 600 g/cm$^2$. The bulk density can be determined by the volume deplacement method described by M. Hwang and K. Hayakawa in "Bulk Densities of Cookies Undergoing Commercial Baking Processes", Journal of Food Science, Vol. 45, 1980, pp. 1400–1407. This method is further described in U.S. Pat. No. 5,043,196. The resilience and compressibility were determined using a Stevens LFRA Texture Analyzer as also described in the aforesaid '196 patent. The disclosure of each of these methods as described in U.S. Pat. No. 5,043,196 is hereby incorporated by reference.

The invention is further illustrated by the following examples with all parts and percentages given by weight and all temperatures in degrees Celsius unless otherwise noted.

EXAMPLE I

Several starch samples were extruded into sheets using an APV MKII 65 mm extruder having an annular die. The first material extruded was high amylose starch (about 70% amylose), hydroxypropylated with about 7% of propylene oxide. The starch feed had particle size ranging from 840 to 1190 microns, obtained using a compact granulation process. Typical extrusion processing conditions used for producing sheets of varying dimensions are shown in Table 1 below:

TABLE 1

|  | A | B |
| --- | --- | --- |
| Sheet Dimensions (approximate) | 17" wide × 1/16" thick | 12" wide × 1/8" thick |
| Feed Rate (lb/hr) | 619 | 655 |
| % Ash or Nucleating Agent (Na$_2$SO$_4$) | 2.46 | 4.34 |
| Die Clearance (mm) | 1.1 | 1.1 |
| Die Cross Sectional Area (mm$^2$) | 152.6 | 152.6 |
| Temperature (at die) (° C.) | 178 | 172 |
| Total Moisture (%) | 21.4 | 19.6 |

The sheets produced were further compressed after exiting the extruder through a calendering roll to provide sheets having suitable flexibility which could be wound into a roll and having other desired properties. Properties of a product made under conditions B and having a thickness of about 0.140" and width of about 12" included: bulk density 5.26 lb/ft$^3$, compressibility 138.0 g/cm$^2$ and resiliency 69.2%.

Sheets were also produced in the same manner using unmodified corn starch blended with 20% of polyvinyl alcohol, and high amylose (70%) starch acetate.

EXAMPLE II

Sample starches similar to Example I were extruded into planks of varying dimensions using extrusion processing conditions shown in Table 2.

TABLE 2

|  | A | B |
| --- | --- | --- |
| Sheet Dimensions | 10" wide × 1/4" thick | 6" wide × 1/2" thick |
| Feedrate (lb/hr.) | 748 | 833 |
| % Ash or Nucleating Agent (Na$_2$SO$_4$) | 1.33 | 1.66 |
| Die Clearance (mm) | 2.2 | 2.2 |
| Die Cross Sectional Area (mm$^2$) | 193.8 | 193.8 |
| Temperature (at die) (° C.) | 169 | 165 |
| Total Moisture (%) | 19.8 | 18.2 |

Planks were produced using high amylose starch (about 70% amylose), hydroxypropylated with about 7% propylene oxide and B process conditions shown above and having a thickness of about 0.4" and width of about 6". These planks had suitable properties including rigidity, bulk density of 5.8 lb/ft$^3$, compressibility of 260 g/cm$^2$ and resilience of 66%. Some of the planks made in this manner were further fabricated by die or saw cutting and laminated together to form assembled planks of greater thickness.

What is claimed is:

1. A structured biodegradable shaped product comprising an expanded, closed cell starch product wherein the product is formed by extruding starch which has a particle size of from about 400 to 1500 microns, the product having a bulk density of from about 2 to 16 lb/ft$^3$, a compressibility of from about 100 to 800 g/cm$^2$ and a resiliency of at least about 20%.

2. The product of claim 1 wherein the starch is selected from the group consisting of corn, potato, wheat, tapioca, waxy maize and high amylose starch having amylose content of at least 40% by weight based on the weight of the starch.

3. The product of claim 2 wherein the starch is a modified starch that is modified by esterification, etherification, oxidation acid hydrolysis, crosslinking or enzyme conversion.

4. The product of claim 1 wherein the high amylose starch has an amylose content of at least 65% by weight based on the weight of the starch.

5. The product of claim 1 wherein the starch contains from 1 to 8% by weight of a nucleating agent selected from the group consisting of inorganic salts and talc.

6. The product of claim 5 wherein the starch is selected from the group consisting of corn, potato, wheat, tapioca, waxy maize and high amylose starch which has an amylose content of at least 40% by weight based on the weight of the starch.

7. The product of claim 6 wherein the starch has an amylose content of at least 65% by weight based on the weight of starch.

8. The product of claim 6 wherein the starch is modified with up to about 15% by weight of alkylene oxide containing 2 to 6 carbon atoms.

9. The product of claim 5 wherein the product is a sheet and the starch contains about 2 to 5% by weight of the nucleating agent.

10. The product of claim 9 which has a bulk density of from about 5.5 to 10 lb/ft$^3$.

11. The product of claim 5 wherein the product is a plank and the starch contains about 1 to 3% by weight of the nulceating agent.

12. The product of claim 11 which has a bulk density of from about 5.5 to 10 lb/ft$^3$.

13. The product of claim 1 wherein the starch particle size is from about 800 to 1200 microns.

14. The product of claim 13 wherein the starch contains from 1 to 8% by weight of the nucleating agent.

15. The product of claim 14 wherein the starch has at least 65% by weight amylose content.

16. The product of claim 15 wherein the starch is modified with up to about 15% by weight of alkylene oxide containing 2 to 6 carbon atoms.

17. The structured product of claim 1 which is a sheet, plank or board having a thickness of up to 4 inches.

18. The structured product of claim 1 which is a sheet having a thickness of up to ¼ inch.

19. The structured product of claim 1 which is a plank or board having a thickness of up to 1 inch.

20. A method of preparing an expanded structured biodegradable shaped product comprising extruding starch which has a particle size of from about 400 to 1500 microns in the presence of a total moisture content of 25% or less by weight and at a temperature of from about 100 to 250° C.

21. The method of claim 20 wherein the starch is selected from the group consisting of corn, potato, wheat, tapioca, waxy maize and high amylose corn.

22. The method of claim 21 wherein the starch is a modified starch.

23. The method of claim 22 wherein the starch is modified with up to about 15% by weight of alkylene oxide containing 2 to 6 carbon atoms.

24. The method of claim 23 wherein the starch has at least 65% by weight amylose content and a starch particle size of from about 800 to 1200 microns.

25. The method of claim 20 wherein the starch contains from 1 to 8% of a nucleating agent.

26. The method of claim 25 wherein the starch is selected from the group consisting of corn, potato, wheat, tapioca, waxy maize and high amylose starch having amylose content of at least 40% by weight based on the weight of the starch.

27. The method of claim 26 wherein the starch is modified with up to about 15% by weight of alkylene oxide containing 2 to 6 carbon atoms.

28. The method of claim 27 wherein the starch has at least 65% by weight amylose content.

29. The method of claim 28 wherein the starch has a particle size of from about 800 to 1200 microns.

* * * * *